United States Patent [19]

Van Meter et al.

[11] 4,212,743

[45] Jul. 15, 1980

[54] FILTER

[75] Inventors: Arch Van Meter, Hanover Park; William J. Gartner, Streamwood, both of Ill.

[73] Assignee: Universal Water Systems, Inc., West Chicago, Ill.

[21] Appl. No.: 2,590

[22] Filed: Jan. 11, 1979

[51] Int. Cl.$^2$ ............................................. B01D 27/00
[52] U.S. Cl. ..................................... 210/282; 210/286; 210/288; 210/443
[58] Field of Search ............... 210/266, 282, 284, 286, 210/287, 288, 283, 264, 304, 308, 309, 421, 428, 449, 440, 441, 443

[56] References Cited

U.S. PATENT DOCUMENTS

| | | | |
|---|---|---|---|
| 560,261 | 5/1896 | Durant | 210/449 X |
| 799,968 | 5/1905 | Ernst | 210/449 X |
| 3,266,628 | 8/1966 | Price | 210/288 X |
| 3,950,251 | 4/1976 | Hiller | 210/282 X |

*Primary Examiner*—John Adee

[57] ABSTRACT

A filter cartridge for use in filters, for example, water filters, includes an inlet for water to be purified and an outlet for filtered water. Partitions within the cartridge define an elongated, tortuous water flow path between the inlet and outlet. Filter pads and activated carbon, or another suitable absorbent material, is disposed in the flow path. The cartridge of the present invention provides effective odor and taste filtering of the water because the water passes over a large area of filter surface as it travels from the inlet to the outlet.

6 Claims, 6 Drawing Figures

FILTER

FIELD OF THE INVENTION

The present invention relates generally to the filtering art and in particular to replacable filter cartridges useful, for example, in water faucet filters.

BACKGROUND OF THE INVENTION

Various impurities, such as minerals and chlorine, often affect the taste, odor and appearance of tap water. In order to remove such impurities, filters are commonly coupled to household water faucets. Such filters typically include a housing for containing a filter and couplings for attaching the filter element into the water stream.

One such variety of this type of filter is described in U.S. Pat. No. 3,853,761, issued Dec. 10, 1978, to Robert M. McClory for a "Filter." The filter described in this patent includes a replaceable water filter cartridge and means for bypassing the cartridge when water purification is not required. The filter is attached to an existing water faucet merely by turning a coupling wheel to lock the filter onto the water spout. The cartridge is contained within a housing and may be removed or replaced merely by unscrewing the housing to expose the cartridge. A deflection mechanism is provided to select flow paths either through the filter cartridge or bypassing the cartridge.

The filter cartridge disclosed in the aforementioned patent is generally tubular and may be formed of any well known filtering material such as activated charcoal. The exterior surface of the filter cartridge is located in spaced relation to the housing wall, while the inside of the tubular cartridge is aligned over the unit's water outlet. Water is filtered by passing it through the tubular wall of the cartridge from the space between the cartridge and the housing toward the outlet. The aforementioned patent also indicates that a perforated tubular support core may be disposed adjacent the inner surface of the cartridge to support the filter against inwardly directed water pressure.

While the filter and cartridge device just described is adequate for some water purification jobs the filter is not especially efficient for use with those water supplies which contain large quantities of impurities. The primary reason is that the filtering path is very small, i.e. the centripital thickness of the filter cartridge. An improved filter cartridge which provides more efficient filtering would be a significant advance in the technology.

OBJECTS OF THE INVENTION

It is primary object of the present invention to provide a filter cartridge which is more efficient than the filters known to the art.

Another object of the present invention is to provide a filter cartridge in which water to be purified has a long contact time with the filtering medium.

Yet another object of the present invention is to provide a filter cartridge which may be used as a replacement cartridge in existing water faucet filters.

Still another object of the present invention is to provide a filter cartridge which has improved strength and which does not collapse under water pressure.

It is still a further object of the present invention to provide a filter cartridge which contains a relatively large quantity of absorptive and filter material and has an increased filter cartridge lifetime.

How these and other objects of the invention are accomplished will be described in the following specification taken in conjunction with the FIGURES. Generally, however, the filter cartridge of the preferred embodiment of the present invention includes a generally cup-shaped housing. The housing includes an axial outlet at one end and internal walls which extend from one end of the housing to the other to form a tortuous flow path from the periphery of the cartridge to its center. An inlet opening is provided adjacent the outside wall of the housing. Filter material, such as activated charcoal, is disposed in the flow path. The cartridge provides a long flow path for water traveling from the inlet to the outlet thereby improving the efficiency of the cartridge. The cartridge is also adaptable to filters of the type which include a provision for bypassing the cartridge when water filtering is not required.

DESCRIPTION OF THE PREFERRED EMBODIMENT

Figure 1:
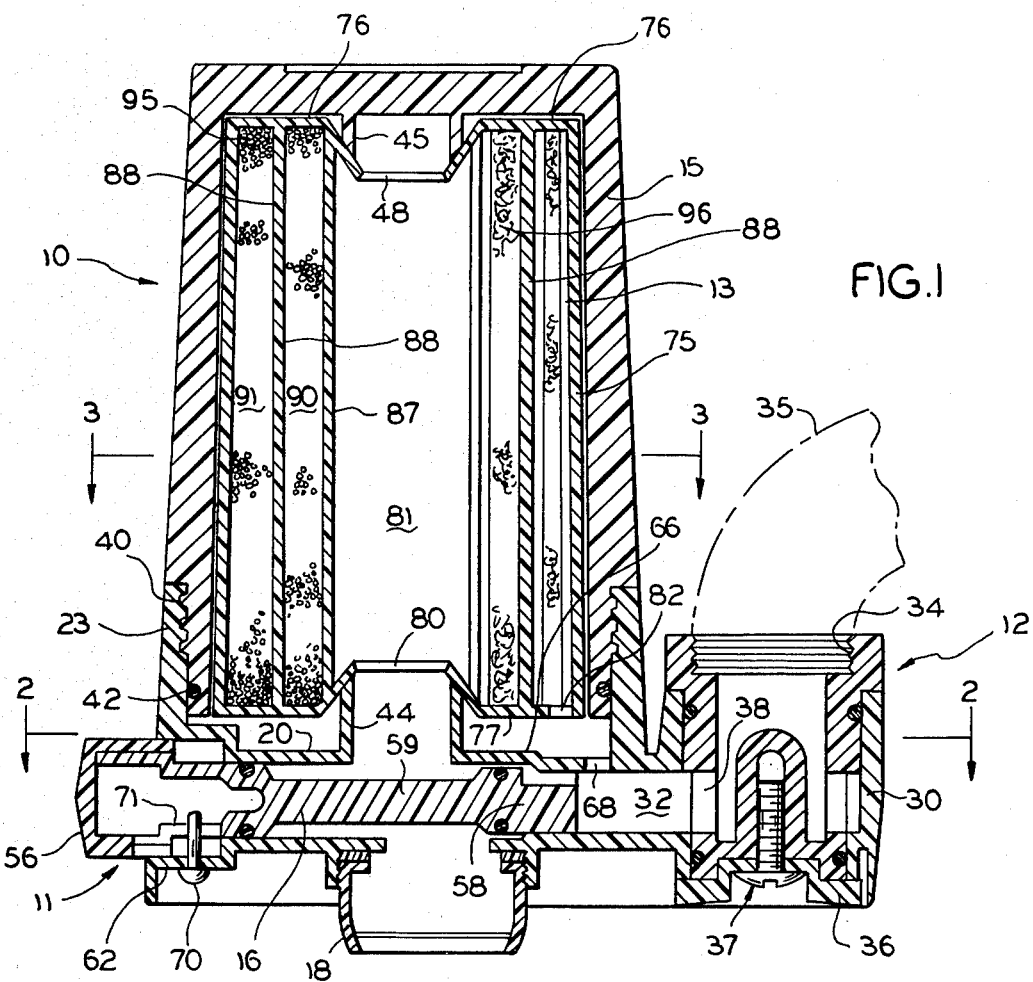
FIG. 1 is a cross-section of an exemplary water faucet filter including a filter cartridge according to the preferred embodiment of the present invention.
Figure 2:
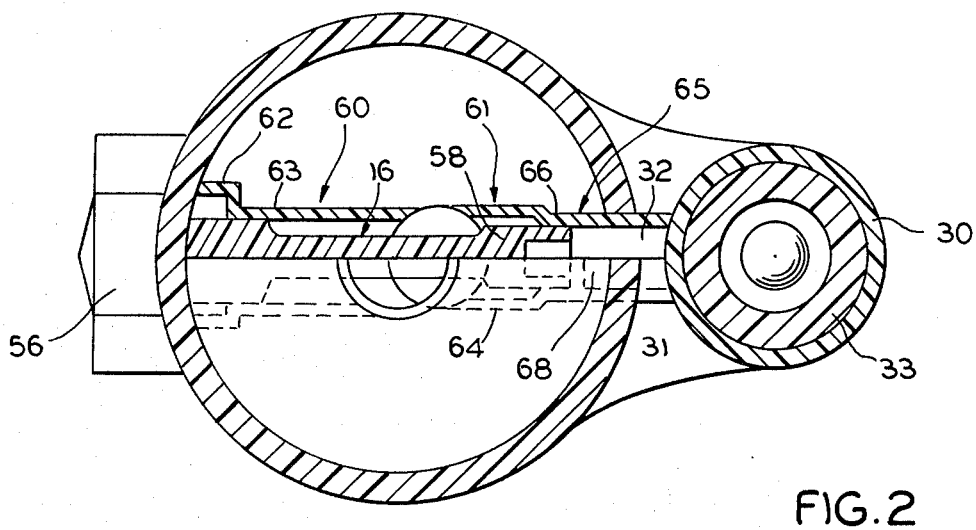
FIG. 2 is a view taken along the line 2—2 of FIG. 1.

FIG. 1 illustrates a typical water filter 10 with which the improved filter cartridge of the present invention may be used. It should be understood at the outset that this particular filter assembly is shown solely for purposes of illustration and that the filter cartridge of the present invention may be used in a variety of other filters known to the art.

Filter 10 includes a base assembly 11 having coupling means 12 at one end for rapid attachment and detachment to a water faucet outlet. A filter cartridge 13 (which will be described later) is mounted above base assembly 11 and within a removable housing 15, and a valve 16 is mounted in base assembly 11 for controlling the flow of water through the filter 10. When valve 16 is in a first position, water entering coupling 12 bypasses the filter 13 and passes directly out of a discharge spout 18 opening into the lower end of base 11. When valve 16 is in a second position, the water is directed through filter cartridge 13 for removal of impurities prior to discharge.

The base 11 is generally circular in plan view and includes an upper wall 20 and a bottom wall 21, walls 20 and 21 being joined by an annular side wall 23.

The coupling assembly 12 includes an outer shell 30 which is integral with and arranged in a generally parallel relation to the side wall 23 and is connected thereto by a hollow, generally tubular connecting portion which defines a passage 32 opening into the interior of shell 30 and the space between the upper and lower walls 20 and 21 of base 11. A coupling member 33 is coaxial with and rotatably mounted within the shell 30 and has internally formed threads 34 at its upper end for attachment to an externally threaded end of a household water faucet 35. To facilitate rotation of the coupling member 33, a thumb wheel 36 may be suitably attached to the lower closed end thereof by means of a screw 37. Wheel 36 also serves to hold coupling member 33 in position so that coupling member 33 may rapidly be replaced with another coupling should this be required to attach to a different size faucet. In addition, a plurality of longitudinal slots 38 are formed in the coupling member 33 so that its interior will be in communication with the passage 32 regardless of its angular position.

The housing 15 has a generally inverted cup shape and may be releasably secured to base 11 in any suitable manner such as by means of threads 40 formed adjacent its lower outside surface for engaging mating threads formed on the inner surface of an annular upwardly extending collar portion of the outer base wall 23. The extreme lower end of housing 15 may be unthreaded for telescopingly engaging an unthreaded portion of wall 23 to provide a sealing surface therebetween which may be augmented by a suitable annular seal 42.

The valve member 16 may have any convenient shape such as for example, a generally bar-like member 59 having a push button 56 suitably affixed on one enlarged end thereof and a valve element 58 formed at its other end. The opposite ends of the valve element 16 are received in tubular valve guide sections 60 and 61 which are coaxial with each other and with the passage 32. Section 60 includes a large diameter portion 62 for receiving the push button 56 and a reduced diamemter portion 63 for receiving the body of valve element 16. Valve guide section 61 also includes a smaller diameter portion 65 for receiving end 58 of the valve member 59. A notch 66 is also formed on the upper portion of valve element 58 to permit flow of fluid out of the reduced diameter portion 65 when the valve is in an open position as will be described more fully below. Further, an opening 68 is formed in the upper base wall 21 adjacent the inner surface of vertical wall 23 to place the upper surface of wall 20 in communication with passage 32.

In operation, when the water faucet 35 is turned on, water under pressure will enter passage 32 and acting on valve element 58 in the manner of a piston, urge it toward the left as viewed in FIG. 1. This permits water flow through notch 66 into the larger diameter portion 64 of valve guide 61 and then downwardly to discharge out of the discharge port 18. A pin 70 extending through the push button guide 62 and into a slot 71 formed in push button 56 limits the outward movement of the valve element 16. When it is desired to pass the fluid through filter cartridge 13, push button 56 is forced inwardly to the right against the water pressure until the unnotched portion of valve element 58 moves into the reduced diameter portion 65 of valve guide 61. This prevents the water from passing through valve guide 61 so that the only water flow path is upwardly through port 68 and into the filter element 13. The water pressure then forces the water through the filter element 13 whereby the water is permitted to discharge from the center of filter element 13 and into exit port 18.

It can, therefore, be seen that the water flows through the filter element 13 only when push button 56 is depressed. When push button 56 is released, the free flow of water around valve element 58 and through the discharge port 18 short circuits the filter element 13 whereby the latter is subject to duty only when required. It will also be appreciated that filter element 13 may be replaced by unscrewing the housing 15, then replacing the used cartridge with an unused element.

Filter cartridge 13 will now be described by particular reference to FIGS. 1 and 3. Cartridge 13 is also generally cup-shaped and includes a housing formed by a generally clyindrical outer wall 75 (wall 75 may be tapered outwardly from top to bottom to conform to the shape of housing 15) and generally planer and circular top and bottom surfaces 76 and 77, respectively. It is supported within housing 15 by a short tubular axially extending section 44 which is formed integrally with and extending upwardly from the upper base wall 20 and a coaxial tubular section 45 which extends downwardly from the upper inner surface of housing 15. Resilient means (not shown) may be provided to provide a snug fit of cartridge 13 within housing 15.

Two holes are provided at the bottom surface 71 of cartridge 13. A first hole 80 is axially aligned with tubular section 44 and communicates with a central, generally tubular opening 81 of cartridge 13, while the second hole 82 is radially displaced from the axis of cartridge 13 adjacent sidewall 75 and is located for being placed adjacent opening 68 for receiving water to be filtered.

Figure 3:
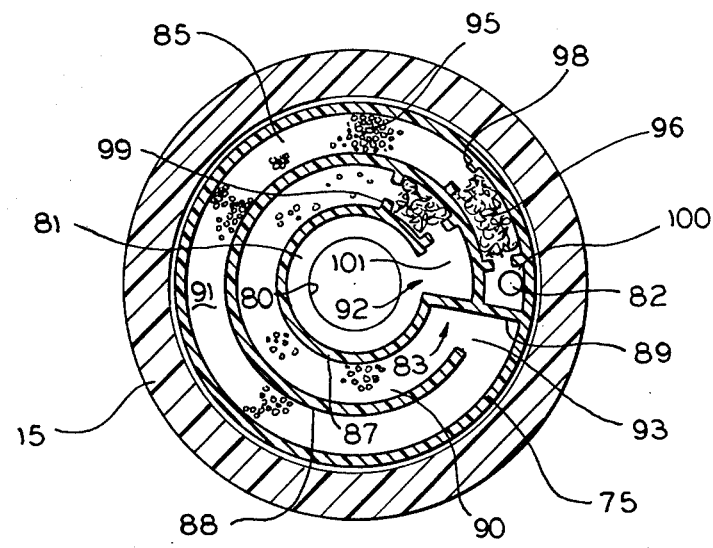
FIG. 3 is a view taken along the line 3—3 of FIG. 1.

The internal construction of cartridge 13 can best be appreciated by reference to FIG. 3 which shows that partitions 83 are provided within the cartridge. Partitions 83 extend between the top 76 and bottom 77 surfaces of cartridge 13 and form a generally circular and tortuous flow path therein. In the illustrated form partition 83 comprises inner and outer generally circular and concentric portions 87 and 88, respectively, and a radially directed straight portion 89 connecting portions 87 and 88 and outer wall 75. Portion 87 defines the central tube 81 of the cartridge, and a generally circular passageway 90 is formed between portions 87 and 88. Another generally circular passageway 91 is formed between partition portion 88 and the outer wall 75. Moreover, two vertical slots 92 and 93 are provided in partition 83, slot 92 being between central tube 81 and passageway 90 while slot 93 is located between passageways 90 and 91. Slots 92 and 93 are on opposite sides of straight portion 89. In its preferred form, the housing for cartridge 13 and partitions 81 are formed from plastic, but metal materials may also be used.

It can therefore be appreciated that water entering filter 13 does so through hole 82 and travels through passageway 91, into passageway 90 through slot 93 and finally into tube 81 through slot 92. In a typical cartridge useful for home water faucets, this tortuous flow path is approximately seven inches using the illustrated partition configuration.

The absorptive material provided in passageways 90 and 91 may be particles of activated carbon 95 or any other water purification media known to the art. In FIGS. 1 and 3 it can also be seen that two plugs 96 of filter media are provided for containing the charcoal in passageways 90 and 91.

The filter media plugs 96 may be polyester filter floss, glass wool or other similar materials and are themselves contained in cartridge 13 by two sets of four filter retention baffles 98 and 99. Baffles 98 are provided adjacent to but inwardly of inlet opening 82 in passageway 91 so that a vertical column 100 is provided above opening 82 extending to top surface 76. Similarly, baffles 99 are located adjacent to but inwardly of slot 92 in passageway 90 so that an open vertical column 101 is provided adjacent slot 92. In the illustrated embodiment the baffles 98 and 99 each comprise two pairs of aligned and spaced apart ribs which are sufficiently thick to retain the filter material but still permit water to flow through the cartridge 13.

It will then be appreciated that when water enters cartridge 13 through opening 82 it will first fill column 100 before entering passageway 91, the density of plugs 96 and filter media 95 being sufficient to create a desirable back pressure against the inward flow of water. For example, in a preferred cartridge according to the present invention, the plugs 96 and media 95 are prepared so that a back pressure of 19 psi results when water is passed through the cartridge at a flow rate of 20 gallons per hour (gph). Plugs 96 also aid in the filtering process by removing particulates which may be present in the raw water supply. Water is then purified by flowing through the total volume of the cartridge 13 rather than through channels or only through a portion of the media thus providing both effective filtering and a long filter lifetime.

The effectiveness of cartridge 13 may be illustrated by comparing its performance with a typical prior art filter, i.e. one which includes a tubular, relatively thin-walled cylinder of filter material. The test procedure comprises passing water at a flow rate of 20 gph through the prior art filter and through the cartridge of the present invention, the overall sizes of the filter housings being the same. The test water contained 0.5 mg/l total chlorine, 0.3 mg/l total iron and a turbidity of 1.0 NTU. Filtered water from each filter was tested periodically for these three components.

Figure 4:
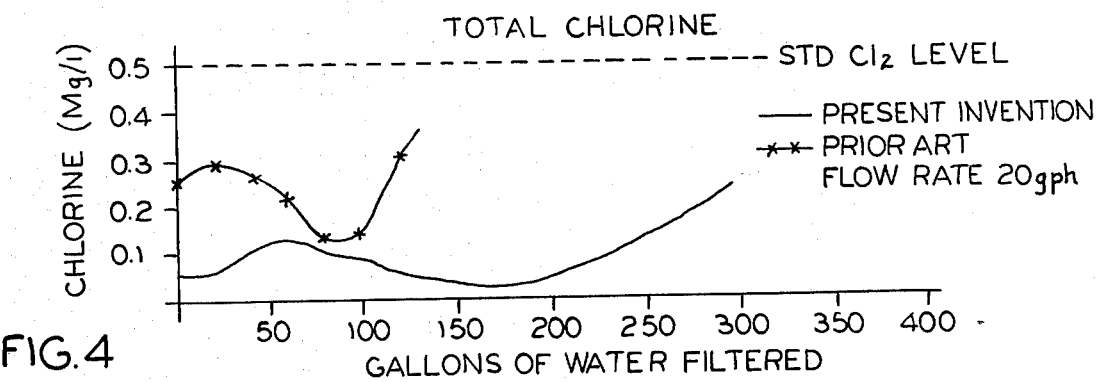
FIGS. 4–6 are graphs comparing the efficiency of the filter cartridge of the present invention with a prior art cartridge.

Dealing first with the total chlorine, it was found the prior art filter effectively reduced the total chlorine to a level of between 0.1 to 0.3 mg/l for the first 100 gallons of filtered water, but thereafter the amount of chlorine removed rapidly diminished and the filtered water's chlorine level rapidly approached the standard of 0.5 mg/l. On the other hand the filter cartridge of the present invention reduced the total chlorine level between 0.15 mg/l for 250 gallons and thereafter the effectiveness only gradually diminished. The results are depicted in FIG. 4.

Figure 5:
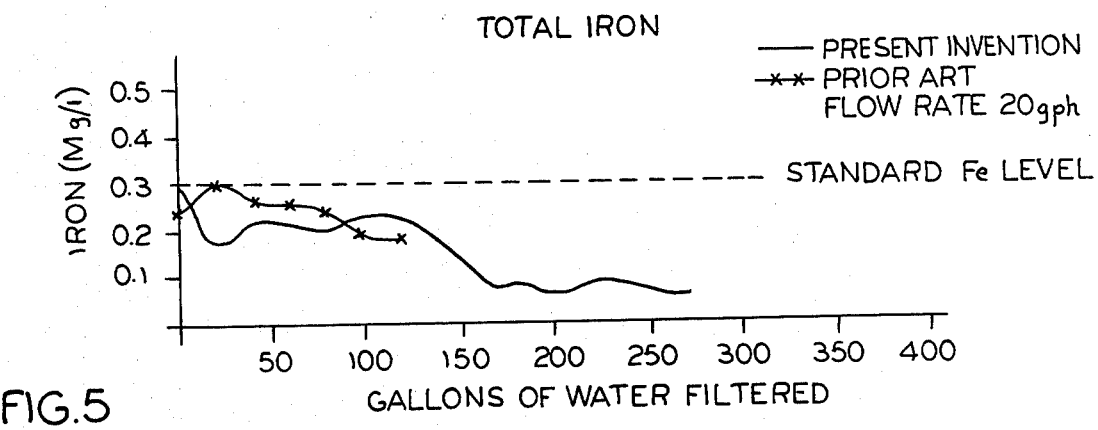
Figure 6:
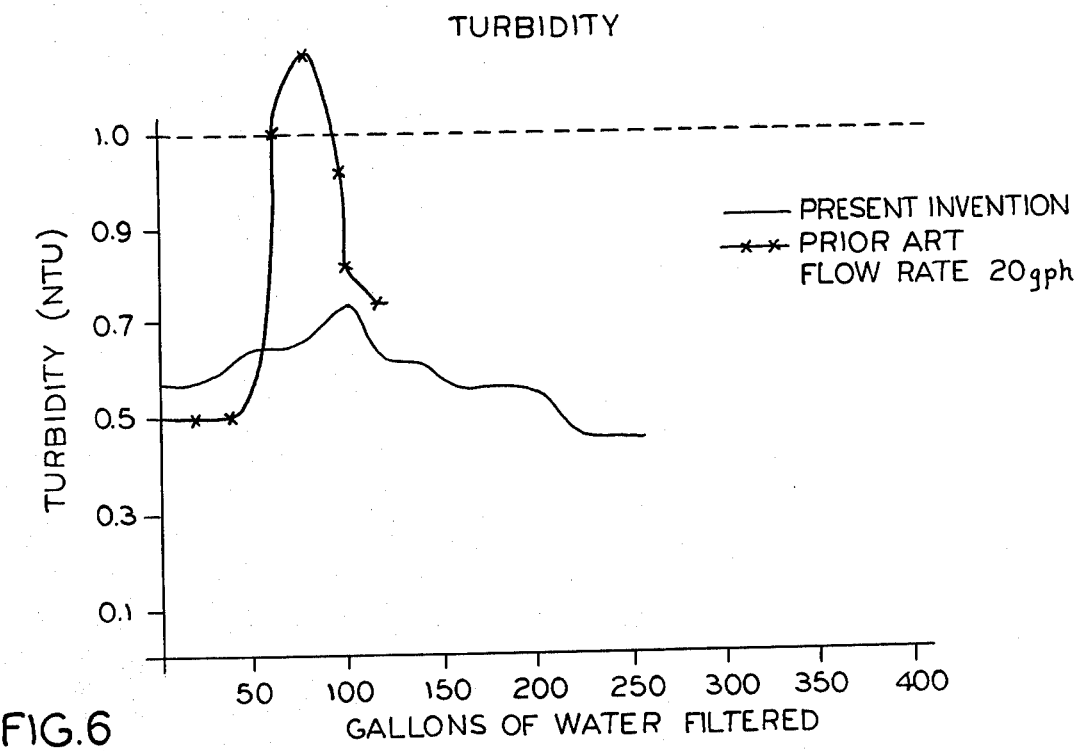

FIG. 5 shows a similar comparison for removal of iron, the effectiveness of cartridge 13 increasing as filtering progresses. As shown in FIG. 6, the present invention also provides improved reduction of turbidity.

While the foregoing description of cartridge 13 has been with reference to one particular illustrated embodiment, cartridge 13 may be constructed in a variety of forms for use in water filtering or for other filtering jobs, e.g. oil filtering. The configuration of the partition may be varied to provide any number of concentric partition portions to increase the liquid flow path. Moreover, while the housing for cartridge 13 has been illustrated as a unitary housing, means can be provided for permitting access to the inside of cartridge 13 to allow replacement of plugs 96 and charcoal 95. The illustrated form however is designed as a totally replaceable unit, cartridge 13 and its contents being disposable after use.

It should also be mentioned that the inlet and outlet openings for cartridge 13 could be reversed, depending on the construction of the filter unit with which the cartridge is to be used and that the configurations of the inlet and outlet openings may be variously embodied. So the invention is not to be limited by the description of the preferred embodiment but is to be limited solely by the claims which follow.

We claim:

1. A filter cartridge comprising a generally cup-shaped housing having a generally cylindrical side wall, circular first and second end surfaces and fluid inlet and outlet openings, one of said openings being through and generally adjacent the edge of one of said end surfaces and the other of said openings being at the center of said one end surface, partition means within said housing extending between said end surfaces and defining a tortuous fluid flow path between said inlet and outlet openings and a quantity of filter material disposed in said flow path, said tortuous flow path including at least two nearly circular segments which extend in opposite directions around the axis of said housing whereby fluid flows through said flow path in planes which generally intersect the axis of said housing.

2. The cartridge set forth in claim 1 wherein said partition means comprise axial, generally concentric and circular wall means extending between said first and second end surfaces and radial wall means intersecting said side wall and said circular wall means, said inlet being located intermediate the outermost one of said circular wall means and said side wall.

3. The cartridge set forth in claim 2 wherein each of said circular wall means includes an opening to permit communication between adjacent portions of said flow path, said openings and said radial wall means being arranged whereby fluid flows in one direction in at least a first flow path portion and in another direction in a second flow path portion.

4. The cartridge set forth in claim 3 wherein the inside one of said circular wall means defines a generally cylindrical cavity in said cartridge, said cavity being closed at one end and whose other end communicates with said outlet opening.

5. The invention set forth in any of claims 1, 2, 3 or 4 wherein said filtering material comprises activated charcoal.

6. The invention set forth in claim 5 wherein two plugs of fibrous material are provided in said flow paths adjacent to but spaced apart from said inlet and outlet to contain said filtering material within said flow path.

* * * * *